United States Patent Office.

PETER GAUGHRAN AND LEWIS SWEENEY, OF SAN FRANCISCO, CALIFORNIA.

Letters Patent No. 67,427, dated August 6, 1867.

IMPROVED MODE OF PRESERVING EGGS.

*The Schedule referred to in these Letters Patent and making part of the same.*

TO ALL WHOM IT MAY CONCERN:

Be it known that we, PETER GAUGHRAN and LEWIS SWEENEY, of the city and county of San Francisco, State of California, have invented or discovered certain new and useful improvements in methods of "Preserving Eggs;" and we do hereby declare the ingredients used and the manner of performing the said process is described in the following specification.

In order to accomplish our object we take fresh eggs and dip them in melted butter or grease, of almost any kind, except tallow, and before they are completely dry we roll them in pulverized wood charcoal, and then pack in the usual manner in boxes or barrels.

The application of this coating to the outside of the shell closes up the pores and prevents the air from getting to the yolk and albumen of the egg, and also forms a substance for the charcoal to adhere to, which prevents the grease from decomposing and becoming rancid. At the expiration of every five or six days the packages containing the eggs so prepared should be turned end for end, so that the yolk will not adhere to the shell by lying too long in one position.

By this means we are enabled to keep eggs for a long time in a perfectly fresh and sweet condition, our experiments having extended to a period of eight months with perfect success, and we are fully confident that eggs treated and put up by our method or process may be kept fresh for a much longer period.

Having thus described our improved method of preserving eggs, what we claim, and desire to secure by Letters Patent, is—

Treating eggs for preservation, substantially in the manner as herein described.

In witness whereof we have hereunto set our hands and seals.

PETER GAUGHRAN. [L. S.]
                  LEWIS SWEENEY.  [L. S.]

Witnesses:
 C. W. M. SMITH,
 GUS. A. MAULT.